US011318981B1

(12) United States Patent
Weselý et al.

(10) Patent No.: US 11,318,981 B1
(45) Date of Patent: May 3, 2022

(54) STOWABLE STEERING COLUMN

(71) Applicants: thyssenkrupp Presta AG, Eschen (LI); thyssenkrupp AG, Essen (DE)

(72) Inventors: Alexander Weselý, Fishers, IN (US); Bryce Welch, Carmel, IN (US); Christian Pichonnat, Indianapolis, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 33 days.

(21) Appl. No.: 17/084,256

(22) Filed: Oct. 29, 2020

(51) Int. Cl.
*B62D 1/183* (2006.01)
(52) U.S. Cl.
CPC .................... *B62D 1/183* (2013.01)
(58) Field of Classification Search
CPC ........ B62D 1/183; B62D 1/184; B62D 1/185; B62D 1/20; B62D 5/003; B62D 5/043; F16C 2226/80; F16D 2001/103
See application file for complete search history.

(56) References Cited

U.S. PATENT DOCUMENTS

| | | | |
|---|---|---|---|
| 10,351,159 B2 | 7/2019 | King | |
| 10,351,161 B2 | 7/2019 | Buzzard | |
| 10,370,022 B2 | 8/2019 | Magnus | |
| 2017/0241472 A1 | 8/2017 | Walser | |
| 2017/0341677 A1* | 11/2017 | Buzzard | F16C 3/03 |
| 2017/0369091 A1* | 12/2017 | Nash | B62D 1/183 |
| 2019/0276070 A1* | 9/2019 | Klinger | B62D 15/0285 |

FOREIGN PATENT DOCUMENTS

| | | | | |
|---|---|---|---|---|
| DE | 102018127098 B3 * | 11/2019 | | B62D 1/185 |
| DE | 102018127099 A | 4/2020 | | |
| WO | WO-2016023691 A * | 2/2016 | | B62D 1/183 |

* cited by examiner

*Primary Examiner* — Paul N Dickson
*Assistant Examiner* — Matthew D Lee
(74) *Attorney, Agent, or Firm* — thyssenkrupp North America, LLC

(57) ABSTRACT

A steering column may have a steering spindle jacket that is disposed within a support assembly. An outer steering spindle may include a spline hub portion and may be disposed within the steering spindle jacket. An inner steering spindle may be disposed within the outer steering spindle and may include a spline shaft portion configured to permit axial movement and prevent rotation of the outer steering spindle when the spline hub portion and the spline shaft portion are engaged. In a deployed state the spline shaft and the spline hub portions may be engaged, and in a stowed state the spline shaft and the spline hub portions may be free of engagement. A base disposed in the support assembly engages the spline hub portion in the stowed state to prevent rotation of the outer steering spindle.

20 Claims, 15 Drawing Sheets

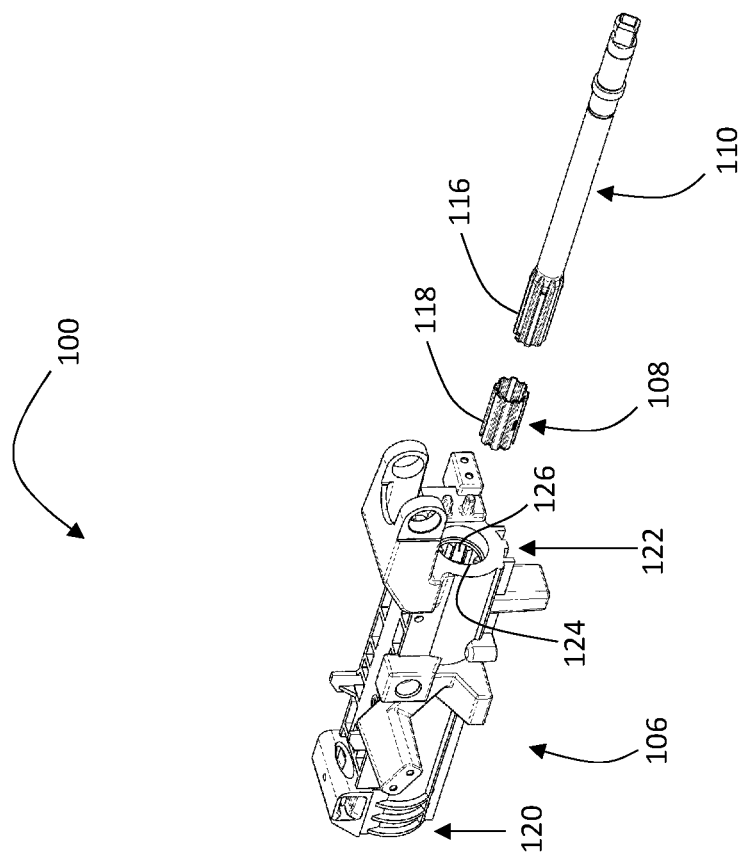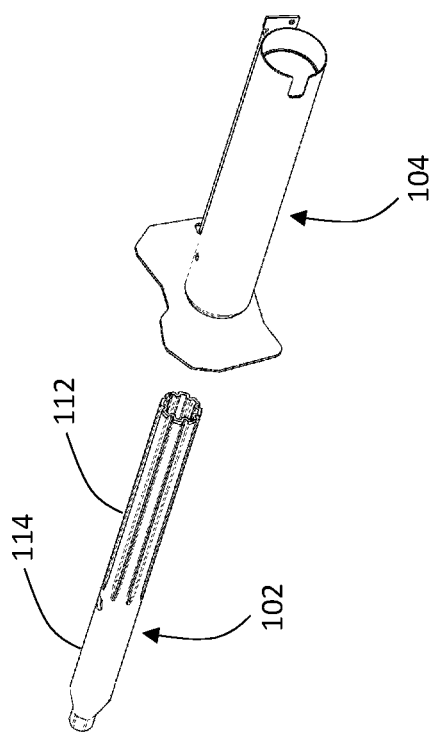
Figure 10

STOWABLE STEERING COLUMN

FIELD OF THE DISCLOSURE

The present disclosure generally relates to steering columns, including stowable steering column assemblies for motor vehicles.

BACKGROUND

A steering column is generally a supported shaft that connects a steering wheel to a gear unit that in turn causes steering wheels of a vehicle to turn in response to user input or system input. Steering columns typically use mechanical systems, hydraulic systems, electromechanical steering systems, and/or steer-by-wire systems, for example. Engineers and vehicle designers have improved the ergonomics of vehicles by providing adjustable steering columns with manual or motorized tilting and telescoping adjustability to increase fitting options for automotive vehicle users and to allow easy ingress and egress. In short, it is increasingly desirable to provide more ways to address the comfort of users. A need exists, therefore, to provide steering columns that enhance vehicle user comfort, convenience, and safety.

SUMMARY

One aspect of the present disclosure contemplates a vehicle steering column that includes a support assembly that comprises a housing. A steering spindle jacket may be disposed within the housing. The steering spindle jacket is movable axially within the housing. An outer steering spindle may be disposed at least in part within the steering spindle jacket. The outer steering spindle is configured to attach to a steering wheel at a proximal end thereof and includes a spline hub portion opposite the proximal end. An inner steering spindle may be disposed at least partially within the outer steering spindle. The inner steering spindle may include a spline shaft portion shaped and sized to permit axial movement and prevent rotation of the outer steering spindle relative to the inner steering spindle when the spline hub portion and the spline shaft portion are engaged. In a deployed (or "non-stowed") state of the steering column, which may encompass a range of operable steering wheel positions according to user preference, the spline shaft portion of the inner steering spindle and the spline hub portion of the outer steering spindle are engaged. Conversely, in a stowed state of the steering column, the spline shaft portion and the spline hub portion are free of engagement.

In other aspects of the disclosure, the outer steering spindle may include an expanded portion that is sized and shaped to receive the spline shaft portion of the inner steering spindle when the steering column is in the stowed state. The expanded portion of the outer steering spindle may have an inner diameter that is greater than an outer diameter of the spline shaft portion. The expanded portion may be proximal relative to the spline hub portion. The spline shaft hub may include internal toothing and at least one external groove or ridge. In some examples, the spline shaft hub may include numerous external grooves or ridges. Further, the steering spindle jacket may be movable axially within the housing. The outer steering spindle may be configured to move axially with the steering spindle jacket, although the outer steering spindle may be configured to rotate within the steering spindle jacket. Finally, the housing of the support assembly may include a base that engages with the spline hub portion in the stowed state to prevent rotation of the outer steering spindle and hence the steering wheel in the stowed state.

BRIEF DESCRIPTION OF THE DRAWINGS

FIG. 10 is an exploded perspective view of several primary components of another example steering column.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Many, if not all, features disclosed herein can be used alone or in combination, even across different examples of the present disclosure. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. Many descriptors such as "first,"

"second," "third," and so on herein aid the description of the drawings, but do not necessarily correspond to like descriptors in the claims, and vice versa. Finally, it should be understood that the present disclosure encompasses alternative variations and step sequences, except where expressly specified to the contrary.

Figure 1:
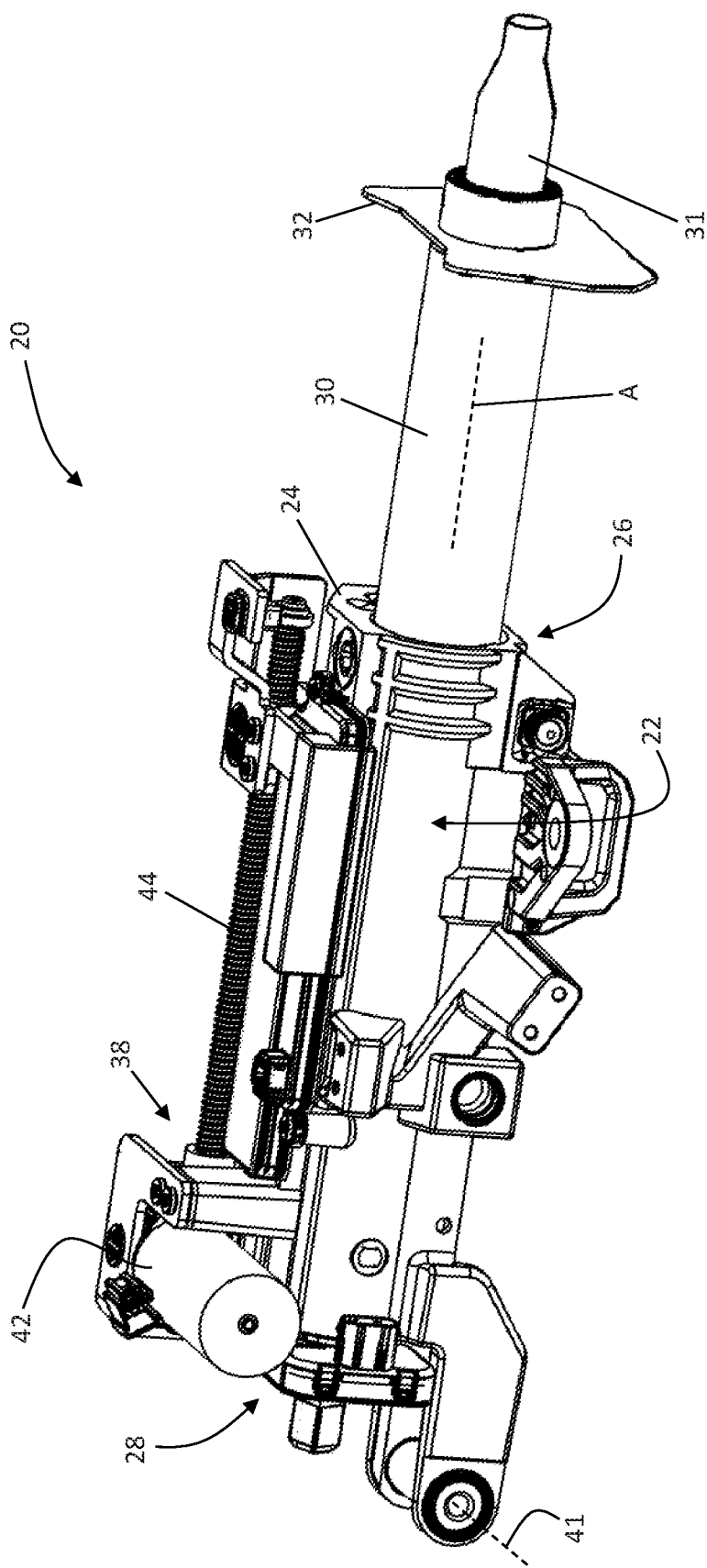
FIG. 1 is a perspective view of one example steering column.

FIG. 1 shows an example steering column 20 of the present disclosure. The steering column 20 generally includes a number of subassemblies. For instance, the steering column 20 includes a support assembly 22, which may also be referred to as a "rocker box" or a "swing bracket." The support assembly 22 may be configured to attach to a vehicle, such as the frame of an automobile or any other suitable vehicle. The support assembly 22 primarily comprises a housing 24 or multiple frame elements configured to hold the steering column 20 to a vehicle frame and accommodate subassemblies that are attached thereto or operatively associated therewith as will be explained herein. The support assembly 22 may be comprised of metal or other suitable materials. For purposes of orientation, the support assembly 22 includes a proximal end 26 that is disposed nearest a user of the steering column 20 and a distal end 28 that is disposed away from the user relative to the proximal end 26. In most cases, the user of the vehicle will be an operator or driver of the vehicle.

The support assembly 22 may be shaped and sized to receive a steering spindle jacket 30 that protrudes from the proximal end 26 of the support assembly 22. The steering spindle jacket 30 is received within the support assembly 22 and may be configured to move in and out of the support assembly 22 along a longitudinal axis A of the steering column 20. The steering spindle jacket 30 may include a control module mount 32 that is configured to receive and attach to a steering column control module. An outer steering spindle 31 or shaft may be rotatably disposed in the steering spindle jacket 30 along the longitudinal axis A. The outer steering spindle 31 may be mounted to or configured to be mounted to a steering wheel.

Further, the example steering column 20 may include a first motor drive assembly 38. The first motor drive assembly 38 may be configured, when actuated, to cause the steering spindle jacket 30 and hence the outer steering spindle 31 to extend and retract along the longitudinal axis A. In some examples, a second motor drive assembly may be included to rotate the support assembly 22 about a pivot axis 41 and thus raise or lower a steering wheel according to user preference.

In one example, the first motor drive assembly 38 includes a motor 42 and a screw 44 that is operatively connected to the motor 42 such that operation of the motor 42 causes rotation of the screw 44. The first motor drive assembly 38 and/or the second motor drive assembly may include a mechanism to convert rotary motion of a screw (e.g., screw 44) to linear motion, such as a threaded rod and nut assembly. Likewise, the first motor drive assembly 38 and/or the second motor drive assembly may be any suitable mechanism for altering the orientation of the steering column 20 for a user.

Figure 2:
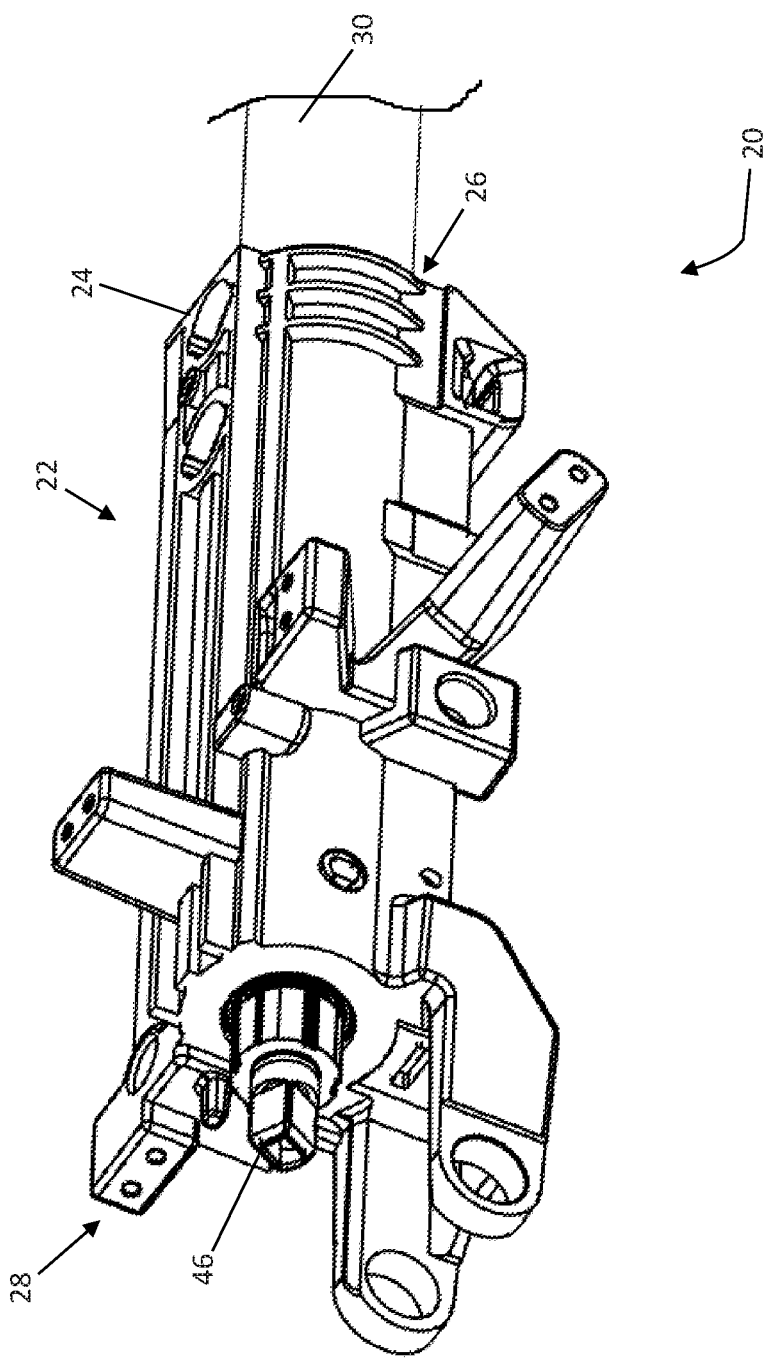
FIG. 2 is a perspective view of the example steering column from a distal end with some outer features removed to show part of an inner steering spindle, a support assembly, and part of a steering spindle jacket.

FIG. 2 shows the example steering column 20 of FIG. 1, with some exterior features removed from the housing 24 to show more interior structure. In particular, one having ordinary skill in the art can see from FIG. 2 how the example housing 24 may be sized and shaped to receive the steering spindle jacket 30 and permit the steering spindle jacket 30 to move axially inwardly and outwardly relative to the housing 24.

Figure 3:
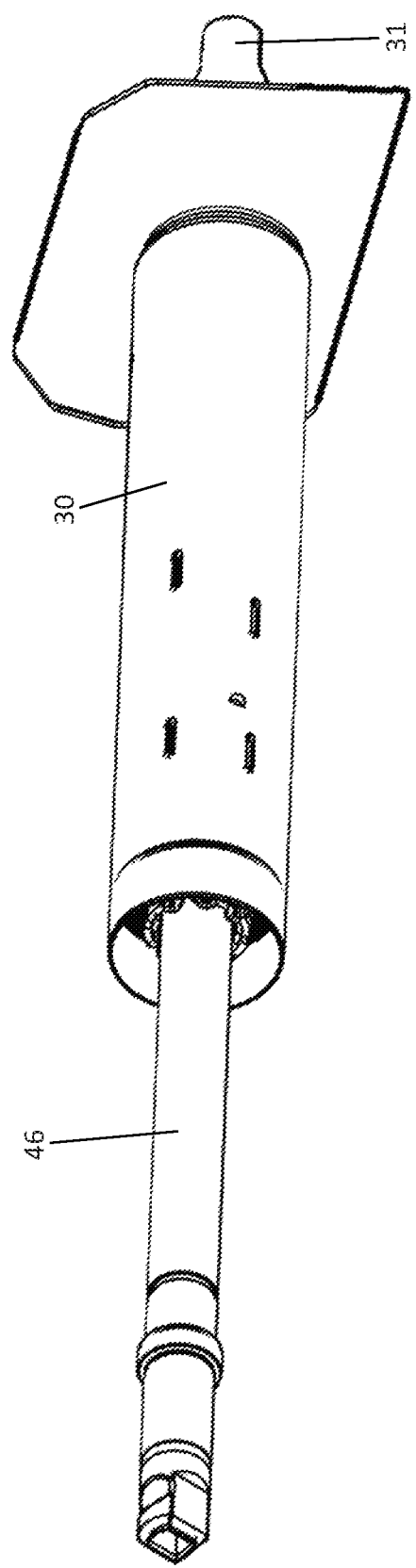
FIG. 3 is a perspective view according to the steering column of FIG. 2 with the support assembly removed.

As explained above with respect to FIG. 1, the outer steering spindle 31 may be rotatably disposed in the steering spindle jacket 30 and may extend therefrom proximally and extend toward a user positioned within a vehicle occupant compartment. Furthermore, an inner steering spindle 46 may extend distally from the steering spindle jacket 30 away from a user, as shown best in FIG. 3. FIG. 3 shows only the outer steering column 31, the inner steering column 46, and the steering spindle jacket 30 of the steering column 20 of FIG. 2. Notwithstanding, FIG. 3 shows the steering spindle jacket 30 and the inner and outer steering spindles 31, 46 in a deployed state. The steering column 20 is fully operational in the deployed state and steering can be performed. In the deployed state, the inner and outer steering spindles 31, 46 are rotatably fixed to each other as shown in more detail in FIG. 6. By contrast, in a stowed state the inner steering spindle 46 is disposed farther within an interior of the outer steering spindle 31, which thereby rotatably decouples the inner and outer steering spindles 46, 31.

To that end and as explained in more detail further below, the outer and inner steering spindles 31, 46 cooperate to transmit user input to steering wheels of a vehicle. Also, outer and inner steering spindles 31, 46 are configured to permit adjustability of the steering wheel and thus adaptability for the user, according to personal preference, comfort, and so on. As will also be explained herein, the outer and inner steering spindles 31, 46 are configured to permit the steering column 20 to be stowed or otherwise moved into a collapsed, contracted position or state whereby more clearance is created in the vehicle cabin to enhance a user's ability to exit and enter the vehicle. Those having ordinary skill in the art will recognize the benefits of stowing the steering column 20 and preventing rotation of a steering wheel while a vehicle is operating in an autonomous driving mode, as a deployed, rotating steering wheel may cause confusion, inconvenience, or even harm to a user in such an autonomous driving mode.

Figure 4:
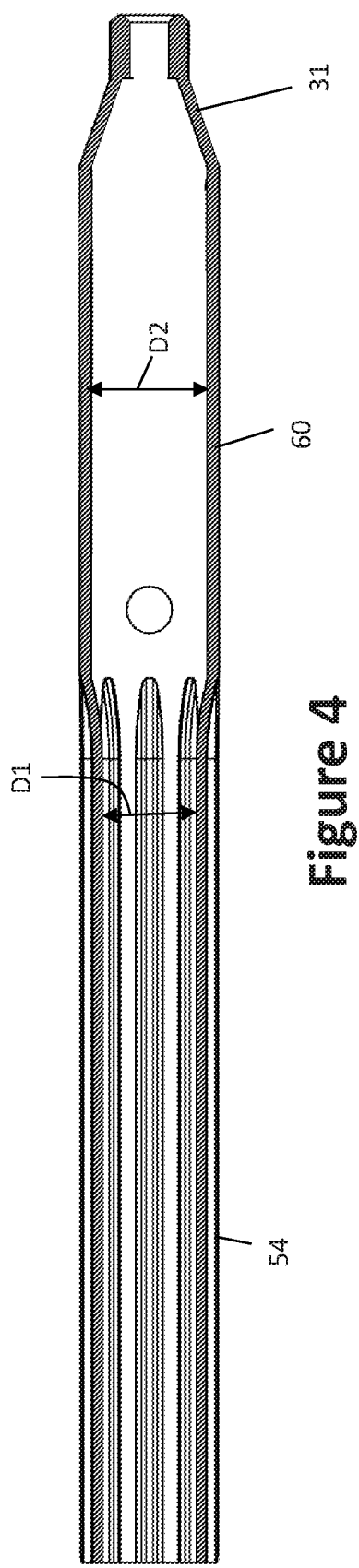
FIG. 4 is a section view of the outer steering spindle.

FIG. 4 shows an example outer steering spindle 31 in longitudinal cross section. The outer steering spindle 31 has two main sections, a spline hub portion 54 that is disposed nearer to the distal end 28 of the support assembly 22 and an expanded portion 60 that is disposed nearer to a user. The spline hub portion 54 may include internal toothing, teeth, inward projections, splines, or the like characterized by a splined hub diameter D1. The non-splined expanded portion 60 may be free of engagement features and may have a non-splined diameter D2, with D1 being less than D2.

Figure 5:
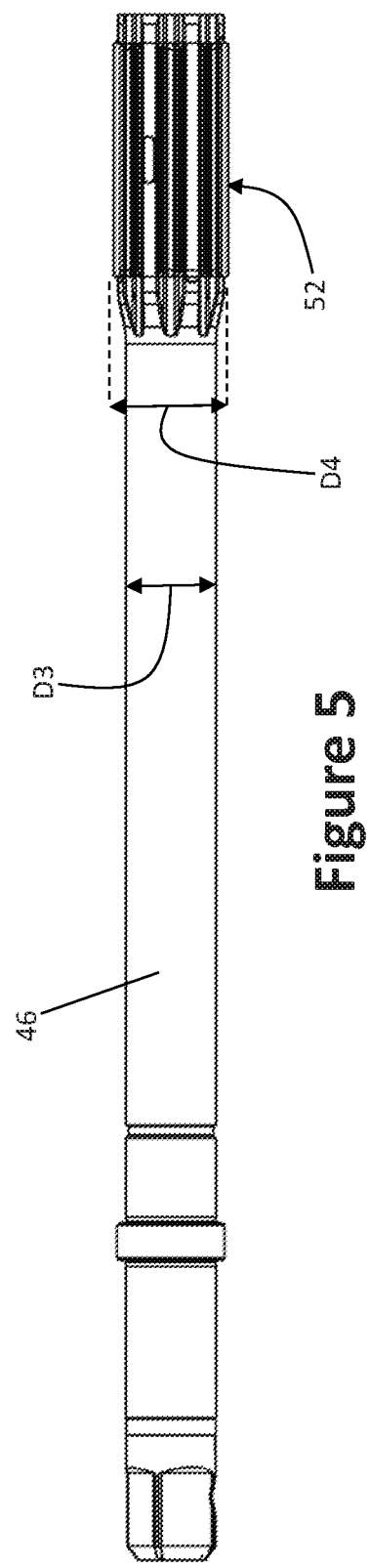
FIG. 5 is a side view of an inner steering spindle.

In some examples, the inner steering spindle 46 as shown in side view in FIG. 5 includes a spline shaft portion 52 that has a toothing, splines, or the like formed on the exterior thereof. The spline shaft portion 52 may be shaped and sized to cooperate or intermesh with and fit within the spline hub portion 54 of the outer steering spindle 31. The spline shaft portion 52 of the inner steering spindle 46 and the interior toothing of the outer steering spindle 31 permit axial movement of the inner and outer steering spindles 46, 31 relative to each other along the longitudinal axis A, but prevent rotation of the inner steering spindle 46 relative to the outer steering spindle 31 when intermeshed or contactingly engaged. As will be explained in more detail below, when the inner and outer steering spindles 46, 31 are not contactingly engaged, as when the steering column is in a collapsed or stowed state, the spline shaft portion 52 of the inner steering spindle 46 and the interior toothing of the outer steering spindle 31 are disengaged because they do not overlap longitudinally. Moreover, the inner steering spindle 46 may generally have a main shaft diameter D3, whereas the spline shaft portion 52 of the inner steering spindle 46 may have a spline shaft diameter of D4, with D4 being greater than D3. In other words, the toothed features of the spline shaft portion 52 may extend outwardly from the main surface diameter D3 of the inner shaft 46.

Figure 6:
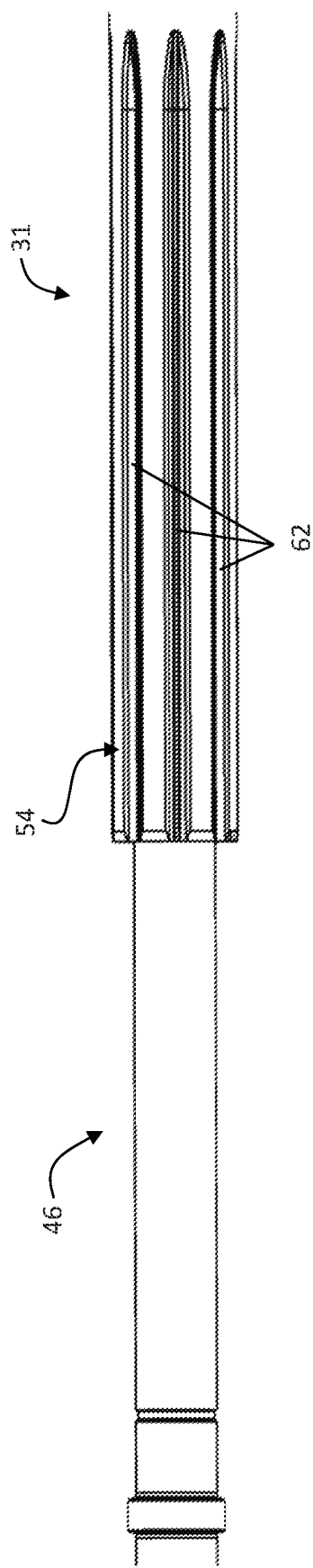
FIG. 6 is a side view of the inner steering spindle and the outer steering spindle.
Figure 7:
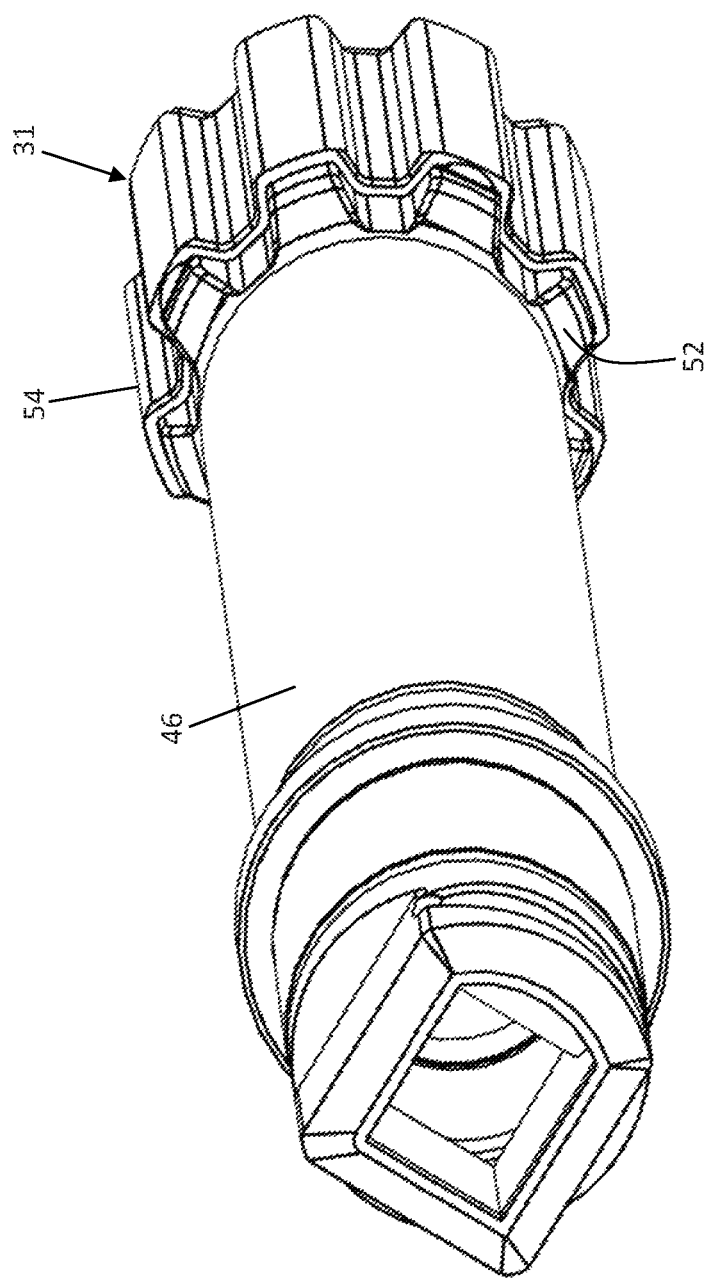
FIG. 7 is a close-up perspective view of engagement between the outer and inner steering spindles.

To be clear, when the spline shaft portion 52 of the inner steering spindle 46 is axially/longitudinally within the expanded portion 60 of the outer steering spindle 31 in the stowed state of the steering column 20, there is no rotational engagement and the inner and outer steering spindles 46, 31 are free to rotate relative to each other and thus no torque is transmitted from one spindle to the other. By contrast, when the spline shaft portion 52 is longitudinally/axially within the spline hub portion 54 of the outer steering spindle 31 as shown in FIGS. 6 and 7, the inner and outer steering spindles 46, 31 are rotatably intermeshed and fixed together rotatably. An exterior of the spline hub portion 54 of the outer steering spindle 31 may include one or more outer grooves and/or ridges 62. Further, a method for creating both the outer and inner features of the outer steering spindle 31 can form the grooves and/or ridges 62 concurrently on the exterior of the spline hub portion 54 and on the toothing of the interior of the outer steering spindle 31.

Turning to FIG. 7, the shape of the spline hub portion 54 of the outer steering spindle 31 intermeshed with the spline shaft portion 52 of the inner steering spindle 46 is shown. FIG. 7 shows in particular the matching contours of the spline hub portion 54 of the outer steering spindle 31 and the spline shaft portion 52 of the inner steering spindle 46 from a perspective of the distal end 28 of the support assembly 22.

Figure 8:
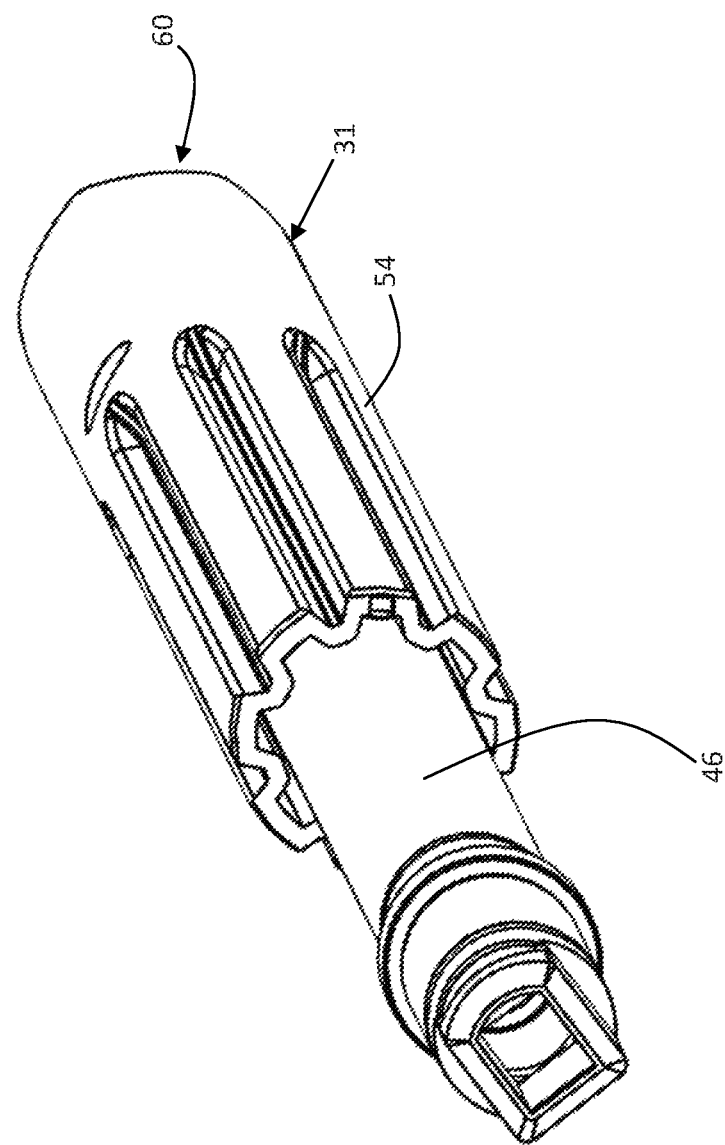
FIG. 8 is another close-up perspective view of the elements of FIG. 6.
Figure 9:
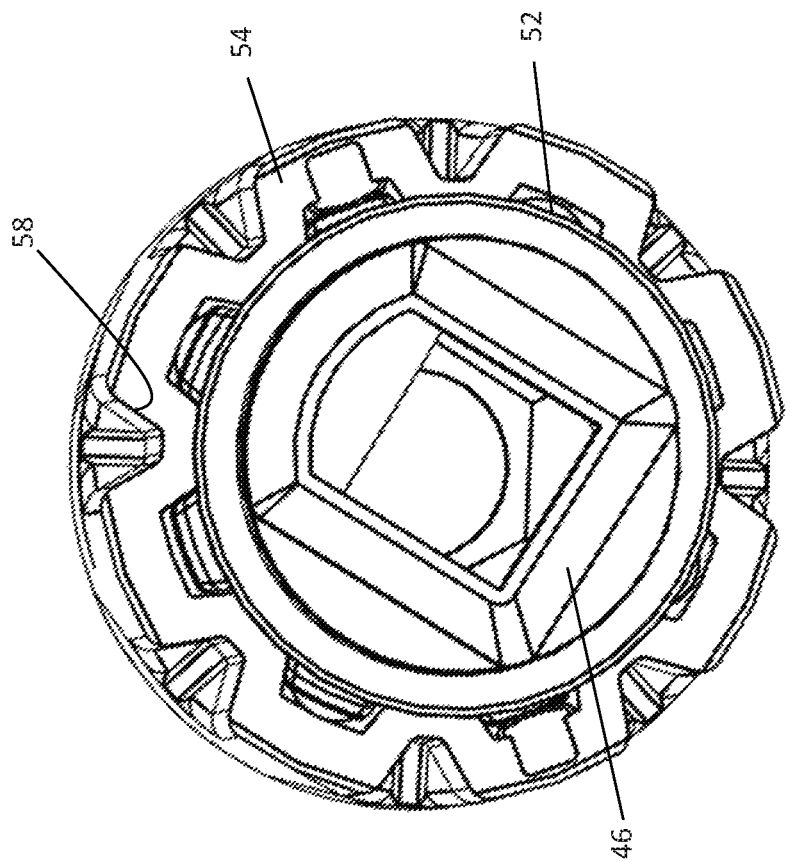
FIG. 9 is a perspective-end view of the steering column of FIG. 7 showing alignment and engagement of the outer steering spindle when the steering column is in a stowed state.

FIG. 8 illustrates a condition where the steering column 20 is transitioning from a deployed state to a stowed state, and FIG. 9 represents the stowed state. Specifically, in the process of collapsing or stowing the steering column 20, the outer steering spindle 31 is caused to move proximally, as in away from a user and toward the inner steering spindle 46. In the context of the present disclosure, collapsing or stowing refers to adjustment or change in states of the steering column 20 that occurs where there is no collision event, and where no energy absorption takes place, as for example, from changes in steering column geometry or state responsive to a user adjustment process. Also, to be clear, the collapsing or stowing process being discussed herein is not the same as that which occurs during a collision, which involves energy absorption. When collapsed, the spline shaft portion 52 disengages from the spline hub portion 54 of the outer steering spindle 31 and is positioned within the expanded portion 60 of the outer steering spindle 31 such that the outer and inner steering spindles 31, 46 become rotatably decoupled from one another. Finally, it should be understood that in some examples the steering spindle jacket 30 and the outer steering spindle 31 move while transitioning between stowed and deployed states, whereas the inner steering spindle 46 and the support assembly 22 remain fixed.

FIG. 10 shows several components from another example steering column 100 in exploded view. The steering column 100 generally includes an outer steering spindle 102, a steering spindle jacket 104, a support assembly 106, a sleeve 108, and an inner steering spindle 110. Needless to say, the example steering column 100 shown in FIG. 10 is in many respects similar to the example steering column 20 shown throughout FIGS. 1-9. It should be understood that many of the features and much of the operation, if not all, disclosed above with respect to the steering column 20 in FIGS. 1-9 may be equally applicable to the example steering column 100 shown in FIG. 10, even if such features and such operation are not explicitly repeated in their entirety hereafter. For example, the outer steering spindle 102 may include a spline hub portion 112 and an expanded portion 114 that are longitudinally spaced apart. The inner steering spindle 110 may include a spline shaft portion 116 configured to be disposed within the outer steering spindle 102, and the outer steering spindle 102 and the steering spindle jacket 104 may be configured to move longitudinally so as to position the spline shaft portion 116 longitudinally at (and radially within) the spline hub portion 112 or the expanded portion 114.

The sleeve 108 may be configured to be securely attached to an exterior of the spline shaft portion 116. Those having ordinary skill in the art will recognize there to be various ways of attaching the sleeve 108 to the spline shaft portion 116 such as by crimping, press-fitting, adhesively bonding, welding, fastening, and/or tacking, for example and without limitation. Indeed, splines 118 of the sleeve 108 may in some examples be formed concurrently with splines of the spline shaft portion 116. Nevertheless, the spline hub portion 112 and the expanded portion 114 of the outer steering spindle 102 may be configured to receive the sleeve 108. An interior of the spline hub portion 112 in particular may be sized and shaped to engage with the splines 118 of the sleeve 108, as an extension of the inner steering spindle 110. In still other examples, the sleeve 108 may be regarded more integrally as a spline shaft portion of the inner steering spindle 110. Either way, the sleeve 108 may be included to simplify the manufacture of the inner and outer steering spindles 110, 102. Alternatively or additionally, the sleeve 108 may comprise composite material and may be included in the steering column 200 to decrease axial/longitudinal friction between the spline hub portion 112 and the spline shaft portion 116.

FIG. 10 also shows the example support assembly 106 as having a proximal end 120 nearest a user and a distal end 122 that is disposed away from the user relative to the proximal end 120. A through opening 124 that extends between the distal end 122 and the proximal end 120 of the support assembly 106 can also be seen in FIG. 10. As explained above, the through opening 124 in the support assembly 106 is configured to accommodate the inner steering spindle 110, the steering spindle jacket 104, and the outer steering spindle 110, although the steering spindle jacket 104 and the outer steering spindle 110 may translate longitudinally relative to and within the through opening 124 depending on whether the steering column 100 is in a stowed position or a deployed position.

More specifically, unlike FIGS. 1-9, FIG. 10 provides a perspective where an example base 126 can be seen within the through opening 124. The base 126 disposed within the through opening 124 may be one or more longitudinally-extending grooves, one or more longitudinally-extending ridges, or a combination thereof, for example and without limitation. Those having ordinary skill in the art will recognize that in some cases ridges and grooves on mating components can be interchanged to achieve the same result. In some examples, the base 126 is configured to mate with and/or receive the spline hub portion 112 of the outer steering spindle 102 when the steering column 100 is in the stowed state so as to prevent rotation of the outer steering spindle 102 and hence the steering wheel when the steering wheel is stowed. Accordingly, the internal groove(s) or ridge(s) of the base 126 may be have a complementary shape to the external ridge(s) or groove(s) of the spline shaft hub. And to cause the corresponding ridge(s)/groove(s) to align when the steering column 100 is transitioning from the deployed state to the stowed state, the ridge(s)/groove(s) of the spline hub portion 112 and/or the base 126 may be acutely pointed in the longitudinal direction and/or slightly helix-shaped to force the respective mating features into alignment.

As explained above, in the stowed state the spline shaft portion 116 of the internal steering column 110 is disposed within the expanded portion 114 of the outer steering column 102 and is free to rotate even though the outer steering spindle 102 is rotatably fixed by the base 126 of support assembly 106. Depending on how the support assembly 106 is manufactured, moreover, the base 126 may be integral to a remainder of the support assembly 106, or the base 126 may be fixedly attached to the remainder of the support assembly 106 as a form of end cap, insert, accessory, appendage, fixture, fitting, etc.

Figure 11:
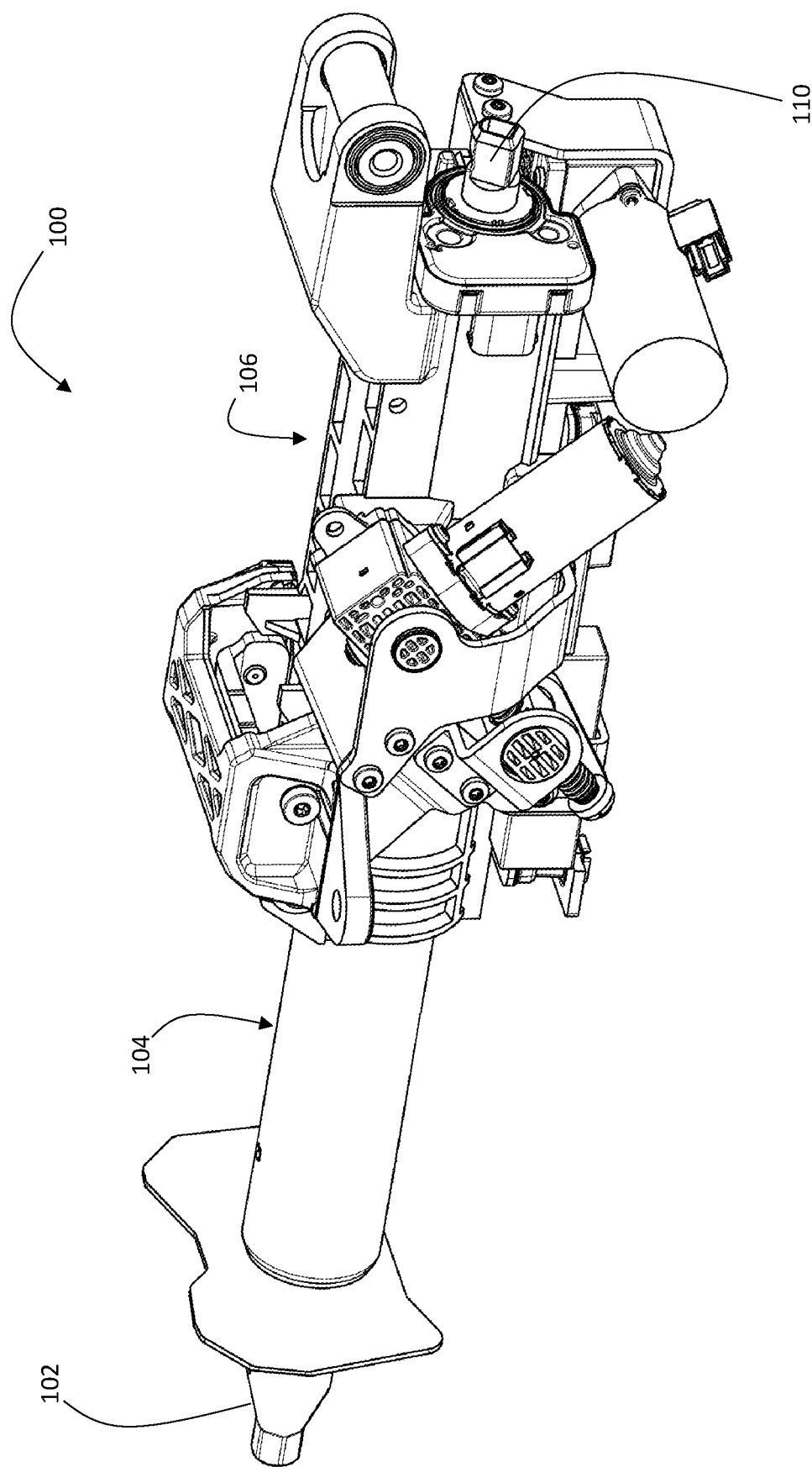
FIG. 11 is a perspective view of the example steering column of FIG. 10 in a deployed state, showing the steering column more completely to include numerous components that were omitted from FIG. 10.
Figure 12:
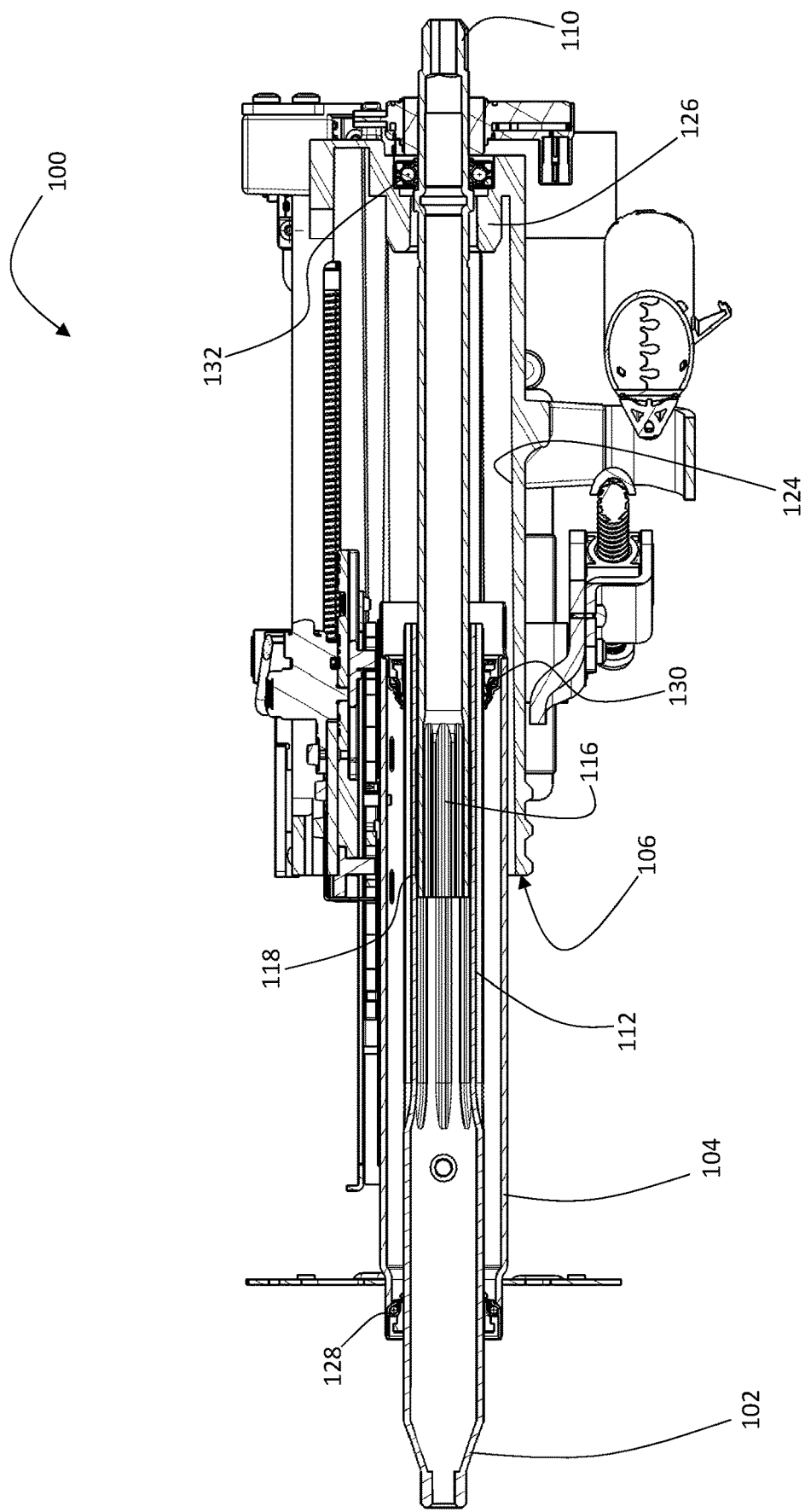
FIG. 12 is a sectional view of the steering column in FIG. 11 in a deployed state, as viewed from above in FIG. 11.
Figure 13:
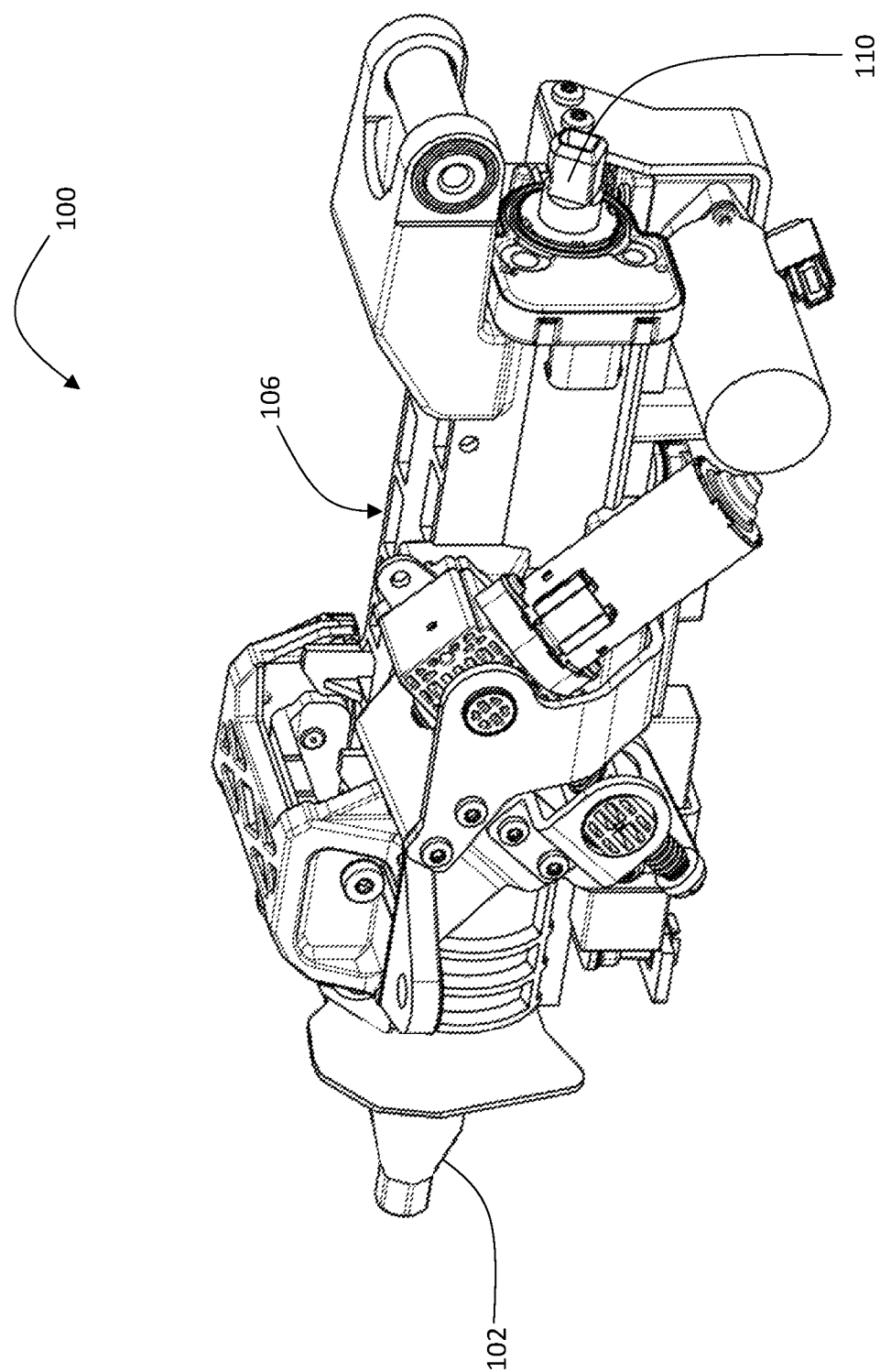
FIG. 13 is a perspective view of the example steering column of FIG. 11 in a stowed state.

FIGS. 11-16 show the example steering column 100 more fully where the steering column 100 is not limited to just the outer steering spindle 102, the steering spindle jacket 104, the support assembly 106, the sleeve 108, and the inner steering spindle 110. FIGS. 11 and 12 show the steering column 100 in the deployed state with the outer steering spindle 102 and the steering spindle jacket 104 protruding significantly from the support assembly 106. FIG. 12 shows the sleeve 108 and/or the spline shaft portion 116 of the inner steering spindle 110 to be engaged with and hence rotatably coupled to the spline hub portion 112 of the outer steering spindle 110. A first bearing 128 nearest a user and a second bearing 130 help secure and facilitate rotation of the outer steering spindle 102 within the steering spindle jacket 104. A third bearing 132 near the distal end 122 of the support assembly 106 helps secure and facilitate rotation of the inner steering spindle 110 within the support assembly 106.

Figure 14:
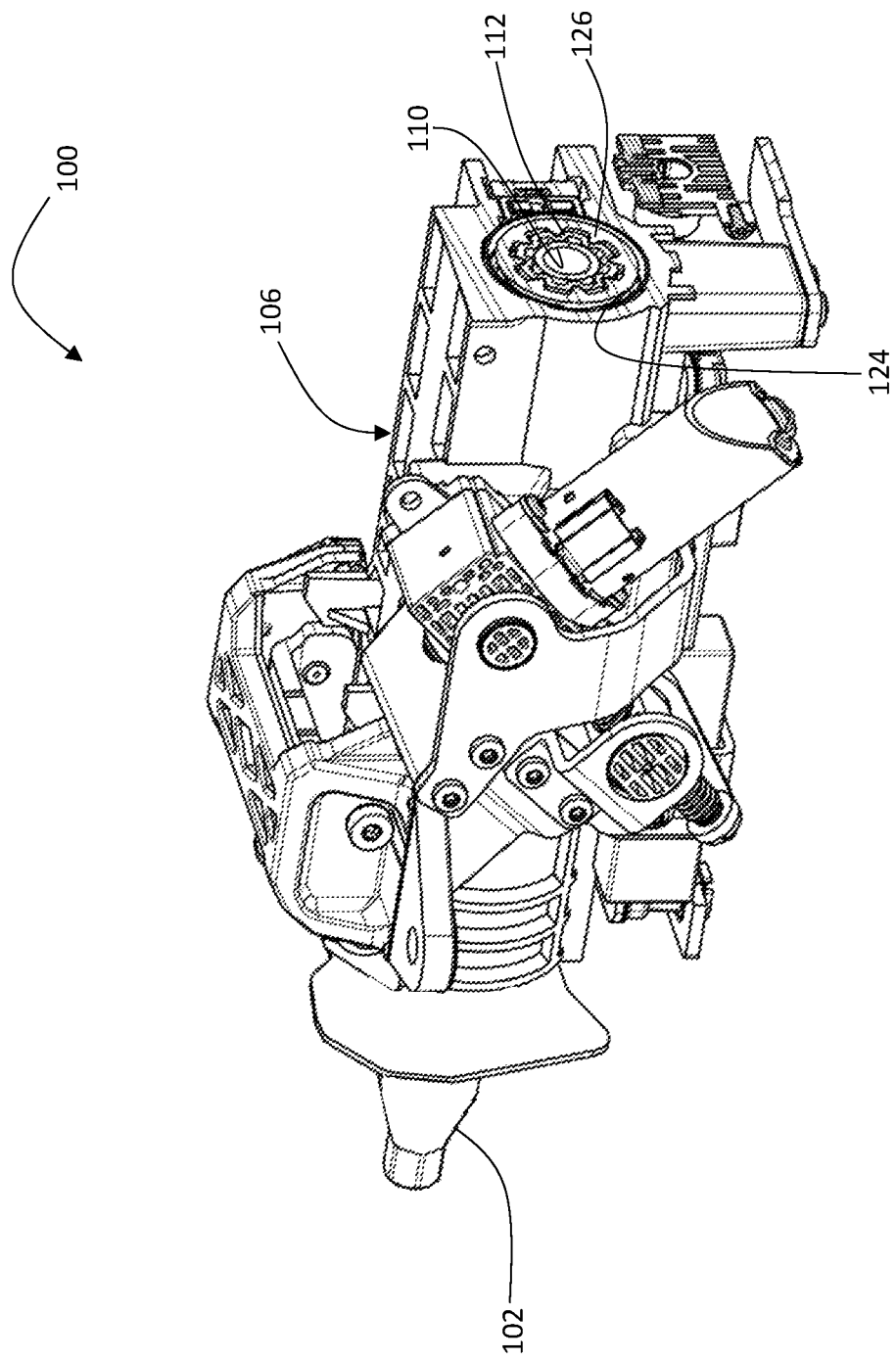
FIG. 14 is a cutaway perspective view of the stowed steering column of FIG. 13, with a distal end of the steering column having been removed.

On the other hand, FIGS. 13-16 show the example steering column 100 in the stowed state, with the outer steering spindle 102 and the steering spindle jacket 104 largely disposed within the support assembly 106. In FIG. 14 a longitudinal segment of the steering column 100 has been cutaway to provide additional perspective within the through opening 124. In this example, the radially innermost component is the inner steering spindle 110, which at the longitudinal location shown does not include any toothings, splines, or other engagement features. Radially outside the inner steering spindle 110 is the outer steering spindle 102 or, more precisely, the spline hub portion 112 of the outer steering spindle 102. The cutaway view of FIG. 14 shows how the spline hub portion 112 is engaged with the base 126 of the support assembly 106 within the through opening 124 so as to prevent rotation of the outer steering spindle 102.

Figure 15:
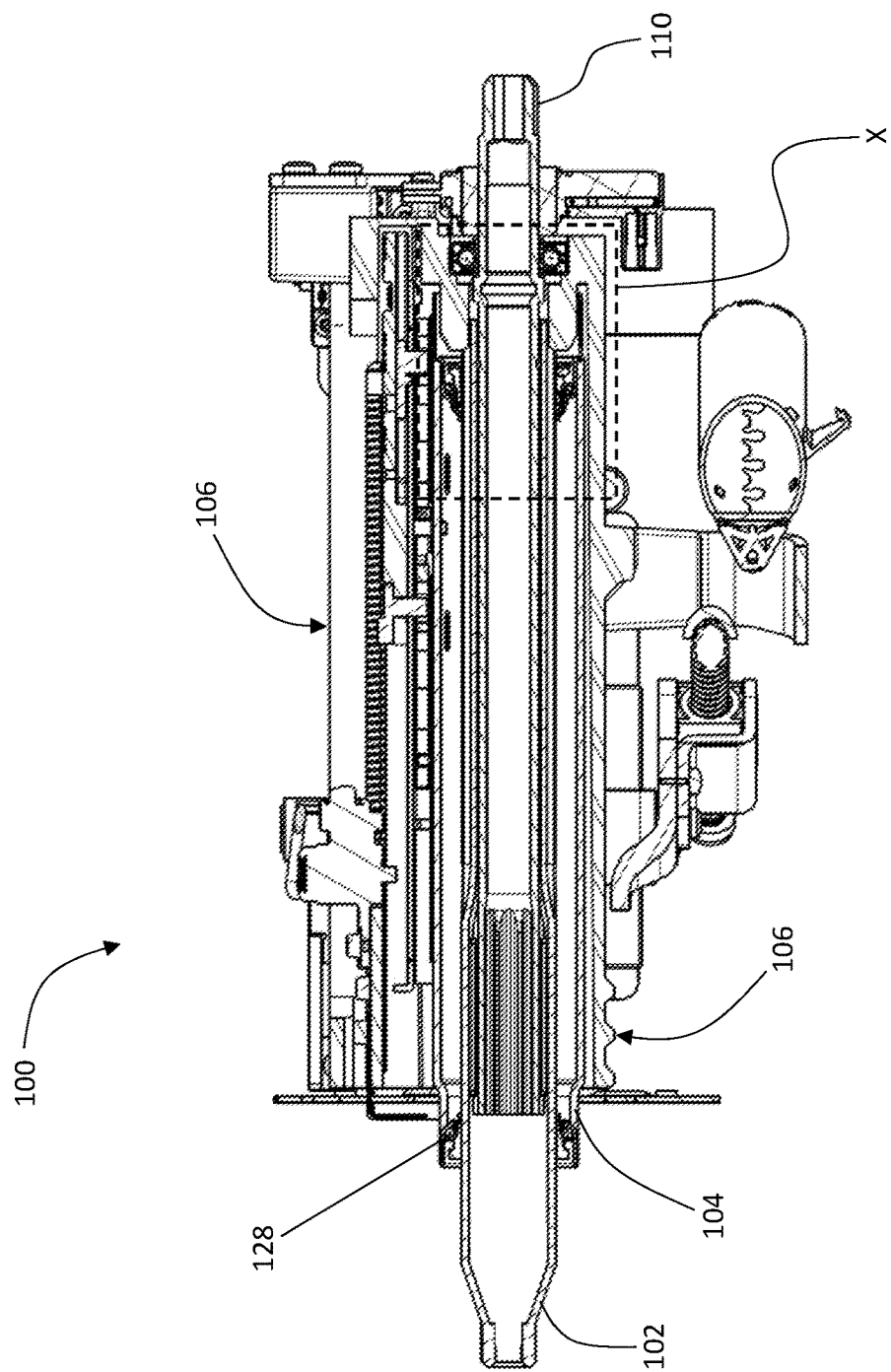
FIG. 15 is a sectional view similar to that of FIG. 12 of the steering column, but with the steering column shown in a stowed state.
Figure 16:
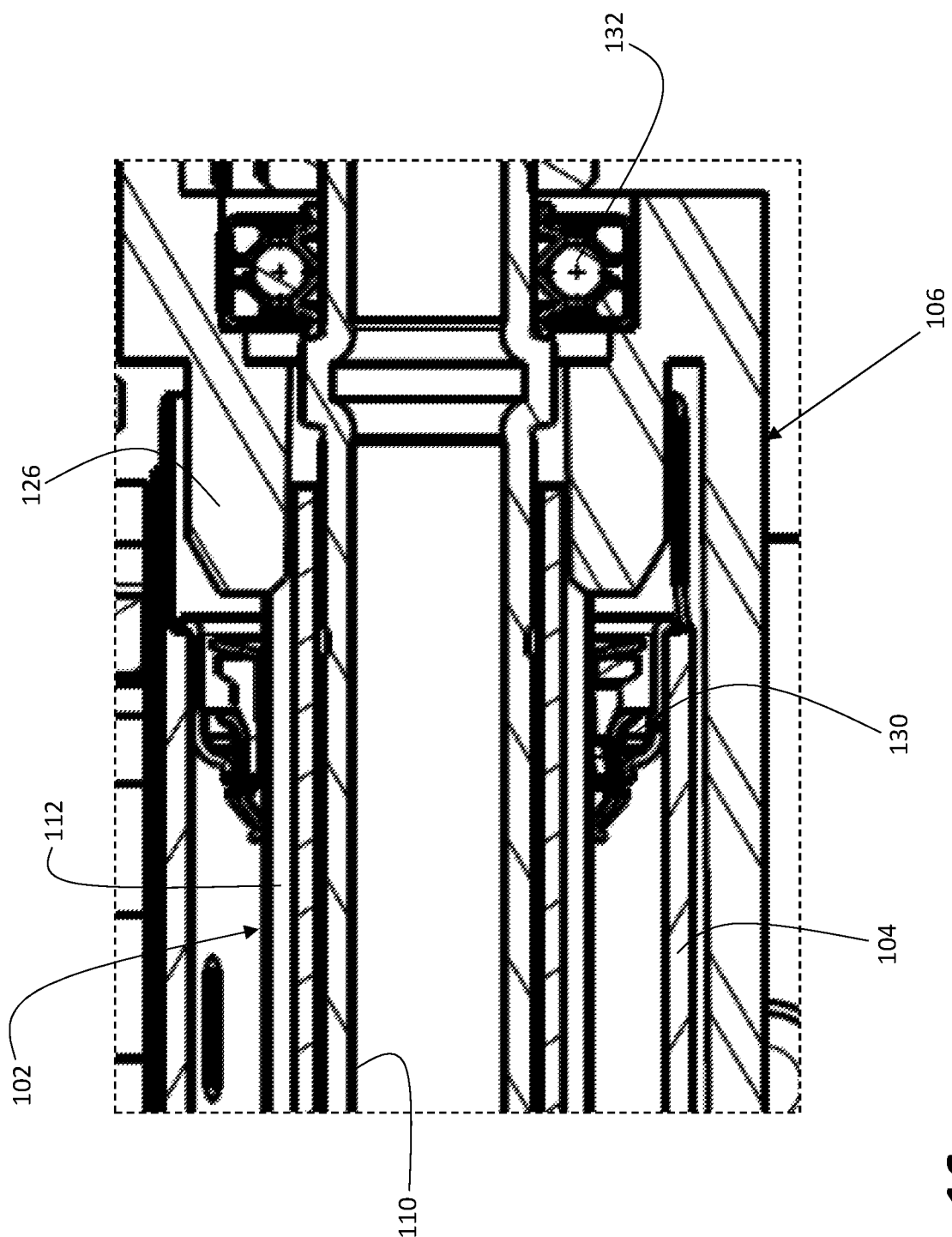
FIG. 16 is a detail sectional view X of the steering column as taken from FIG. 15.

The sectional view in FIG. 15 and the detail X thereof in FIG. 16 of the example steering column 100 provide still further perspective as to how the outer steering spindle 102 and the steering spindle jacket 104 can be disposed in the support assembly 106 in the stowed state. FIGS. 15 and 16 also show one example way in which the base 126 of the support assembly 106 can engage with the spline hub portion 112 of the outer steering spindle 102 to prevent rotation of the outer steering spindle 102 in the stowed state.

While the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further examples with any combination of features from different examples described above and below. Additionally, statements made herein characterizing the disclosure refer to an example of the disclosure and not necessarily all examples.

What is claimed is:

1. A steering column comprising:
an outer steering spindle having a spline hub portion;
an inner steering spindle that includes a spline shaft portion and is disposed at least partially within the outer steering spindle, wherein the inner and outer steering spindles extend along a longitudinal axis, wherein in a deployed state the spline shaft portion of the inner steering spindle is engaged with the spline shaft hub portion of the outer steering spindle such that the outer steering spindle and the inner steering spindle are rotatably coupled, wherein in a stowed state the spline shaft portion of the inner steering spindle is disengaged from the spline shaft hub portion of the outer steering spindle such that the outer steering spindle and the inner steering spindle are rotatably decoupled; and
a support assembly with an opening in which the inner and outer steering spindles are at least partially disposed, wherein the support assembly comprises a base disposed in the opening that engages the spline shaft hub portion of the outer steering spindle in the stowed state to prevent the outer steering spindle from rotating.

2. The steering column of claim 1 comprising a steering spindle jacket in which the outer steering spindle is at least partially disposed, wherein the steering spindle jacket is configured to be at least partially received in the opening in the support assembly.

3. The steering column of claim 2 wherein the outer steering spindle is rotatably decoupled from the steering spindle jacket, wherein the steering spindle jacket is configured to move with the outer steering spindle along the longitudinal axis.

4. The steering column of claim 2 comprising:
a first bearing disposed radially between the outer steering spindle and the steering spindle jacket; and
a second bearing disposed radially between the inner steering spindle and the support assembly.

5. The steering column of claim 2 wherein the inner steering spindle is longitudinally fixed in the support assembly and rotatably decoupled from the support assembly, wherein the outer steering spindle and the steering spindle jacket protrude from the support assembly more in the deployed state than in the stowed state.

6. The steering column of claim 1 wherein the spline hub portion of the outer steering spindle has a first inner diameter and an expanded portion of the outer steering spindle that is longitudinally spaced apart from the spline hub portion has a second inner diameter, wherein the second inner diameter is larger than the first inner diameter.

7. The steering column of claim 6 wherein in the stowed state the spline shaft portion of the inner steering spindle is disposed within the expanded portion of the outer steering spindle.

8. The steering column of claim 1 comprising a non-metallic composite sleeve that is disposed on the inner steering spindle and defines the spline shaft portion.

9. The steering column of claim 1 wherein a contour of the spline shaft portion matches a contour of the spline shaft hub portion.

10. A steering column comprising:
a support assembly;
a steering spindle jacket extending along a longitudinal axis and disposed at least partially within the support assembly;

an outer steering spindle disposed at least partially within the steering spindle jacket, the outer steering spindle configured to attach to a steering wheel at a proximal end thereof and including a spline hub portion opposite the proximal end;

an inner steering spindle disposed at least partially within the outer steering spindle, the inner steering spindle including a spline shaft portion configured to permit longitudinal movement and to prevent rotation of the outer steering spindle relative to the inner steering spindle when the spline hub portion and the spline shaft portion are engaged in a deployed state, wherein in a stowed state the spline shaft portion and the spline hub portion are free of engagement; and a base disposed in the support assembly that engages the spline hub portion in the stowed state to prevent rotation of the outer steering spindle.

11. The steering column of claim 10 wherein the outer steering spindle includes an expanded portion that is configured to receive the spline shaft portion in the stowed state.

12. The steering column of claim 11 wherein the expanded portion of the outer steering spindle has an inner diameter that is greater than an outer diameter of the spline shaft portion.

13. The steering column of claim 11 wherein the expanded portion is longitudinally spaced apart from the spline hub portion of the outer steering spindle.

14. The steering column of claim 10 wherein the spline shaft hub includes an internal toothing and an external ridge or groove.

15. The steering column of claim 14 wherein in the stowed state the base engages the external ridge or groove of the spline shaft hub to prevent rotation of the outer steering spindle.

16. The steering column of claim 15 wherein the base comprises an internal groove or ridge that has a complementary shape to the external ridge or groove of the spline shaft hub.

17. The steering column of claim 10 wherein the steering spindle jacket and the outer steering spindle are movable longitudinally within the support assembly.

18. The steering column of claim 10 wherein the steering spindle jacket is rotatably fixed to the support assembly, wherein the outer steering spindle is configured to rotate within the steering spindle jacket.

19. A steering column comprising:

an outer steering spindle having a spline hub portion with a first inner diameter and an expanded portion with a second inner diameter that is larger than the first inner diameter;

an inner steering spindle that includes a spline shaft portion and is disposed at least partially within the outer steering spindle, wherein the inner and outer steering spindles extend along a longitudinal axis, wherein the outer steering spindle is movable along the longitudinal axis relative to the inner steering spindle such that in a stowed state the spline shaft portion of the inner steering spindle is disposed within the expanded portion of the outer steering spindle and such that in a deployed state the spline shaft portion of the inner steering spindle is disposed within and engaged with the spline shaft hub portion of the outer steering spindle, wherein in the stowed state the outer steering spindle rotates with the inner steering spindle, wherein in the deployed state the outer steering spindle is rotatably decoupled from the inner steering spindle; and a support assembly comprising a housing with an opening in which the inner and outer steering spindles are at least partially disposed, wherein the support assembly comprises a base that engages with the spline shaft hub portion in the stowed state to prevent the outer steering spindle from rotating.

20. The steering column of claim 19 wherein the inner steering spindle is longitudinally fixed within the opening of the housing, wherein in the stowed state the spline shaft portion is disposed within the expanded portion at a longitudinal location that is within the opening in the housing, wherein in the deployed state the spline shaft portion is disposed within the spline shaft hub portion at the longitudinal location that is within the opening in the housing.

* * * * *